(12) United States Patent
Yang et al.

(10) Patent No.: US 12,026,466 B1
(45) Date of Patent: Jul. 2, 2024

(54) DISTANT SUPERVISION FOR DATA ENTITY RELATION EXTRACTION

(71) Applicant: AiLife Diagnostics, Inc., Pearland, TX (US)

(72) Inventors: Yaping Yang, Pearland, TX (US); Weizhi Xu, Shandong (CN); Jiran Zhu, Shandong (CN); Xia Wang, Sugar Land, TX (US); Hui Yu, Shandong (CN)

(73) Assignee: AILIFE DIAGNOSTICS, INC., Pearland, TX (US)

( * ) Notice: Subject to any disclaimer, the term of this patent is extended or adjusted under 35 U.S.C. 154(b) by 0 days.

(21) Appl. No.: 18/183,077

(22) Filed: Mar. 13, 2023

(51) Int. Cl.
G06F 40/284 (2020.01)
G06F 18/241 (2023.01)
G06F 40/126 (2020.01)

(52) U.S. Cl.
CPC .......... *G06F 40/284* (2020.01); *G06F 18/241* (2023.01); *G06F 40/126* (2020.01)

(58) Field of Classification Search
CPC ..... G06F 40/284; G06F 40/126; G06F 18/241
USPC ........................................................ 704/233
See application file for complete search history.

(56) References Cited

U.S. PATENT DOCUMENTS

| | | | | |
|---|---|---|---|---|
| 11,487,942 B1* | 11/2022 | Senthivel | ............. | G06N 3/0442 |
| 2017/0132206 A1* | 5/2017 | Kumagai | ............... | G06F 16/322 |
| 2020/0073933 A1* | 3/2020 | Zhao | ...................... | G06F 40/117 |
| 2023/0281391 A1* | 9/2023 | Mamy | .................... | G06T 11/206 |
| | | | | 704/9 |

FOREIGN PATENT DOCUMENTS

| | | | | |
|---|---|---|---|---|
| CN | 111914568 A | * | 11/2020 | ........... G06F 16/367 |
| CN | 112270196 B | * | 4/2022 | ............ G06F 16/35 |
| CN | 115510855 A | * | 12/2022 | |

OTHER PUBLICATIONS

D. Christou and G. Tsoumakas, "Improving Distantly-Supervised Relation Extraction Through BERT-Based Label and Instance Embeddings," in IEEE Access, vol. 9, pp. 62574-62582, 2021, doi: 10.1109/ACCESS.2021.3073428. (Year: 2021) (Year: 2021).*

V.-T. Phi, J. Santoso, V.-H. Tran, H. Shindo, M. Shimbo and Y. Matsumoto, "Distant Supervision for Relation Extraction via Piecewise Attention and Bag-Level Contextual Inference," in IEEE Access, vol. 7, pp. 103570-103582, 2019, doi: 10.1109/ACCESS .2019. 2932041. (Year: 2019) (Year: 2019).*

\* cited by examiner

*Primary Examiner* — Bharatkumar S Shah
(74) *Attorney, Agent, or Firm* — Perkins Coie LLP

(57) ABSTRACT

A method for entity relations extraction including applying entity markers to a set of sentences included in a data bag to generate a token sequence for a subset of the set of sentences, the token sequence including a beginning position mark and an ending position mark of a corresponding sentence, as well as a front position mark and a rear position mark of at least one entity included in each of the subset of the set of sentences; using the generated token sequences of the set of sentences with a pre-trained language representation model to generate a sentence feature vector for each sentence included in the data bag; aggregating, in a data encoding module, the sentence feature vectors of the set of sentences into a bag encoding vector; and classifying data entity relations of the set of sentences included in the data bag through decoding and inferencing the bag encoding vector.

15 Claims, 8 Drawing Sheets

600

```
┌─────────────────────────────────────────────────────┐
│ Mark the beginning and ending locations of each of  │
│ the subset of the set of sentences                  │
│                                                 602 │
└─────────────────────────────────────────────────────┘
                          │
                          ▼
┌─────────────────────────────────────────────────────┐
│ Identify a first front position and a first rear   │
│ position of the head entity and a second front      │
│ position and a second rear position of the tail     │
│ entity                                          604 │
└─────────────────────────────────────────────────────┘
                          │
                          ▼
┌─────────────────────────────────────────────────────┐
│ Mark the identified first front position and first  │
│ rear position at the beginning and ending locations │
│ of the head entity respectively                 606 │
└─────────────────────────────────────────────────────┘
                          │
                          ▼
┌─────────────────────────────────────────────────────┐
│ Mark the identified second front position and       │
│ second rear position at the beginning and ending    │
│ locations of the tail entity respectively       608 │
└─────────────────────────────────────────────────────┘
```

*FIG. 6*

DISTANT SUPERVISION FOR DATA ENTITY RELATION EXTRACTION

TECHNICAL FIELD

The present disclosure relates to the field of natural language processing technology and, in particular, to distantly supervised biomedical entity relation extraction.

BACKGROUND

Biomedical literature has been rapidly grown in recent years and it is particularly important to extract useful biomedical information and knowledge from the enormous amounts of unstructured data. However, due to the specialized nature of expertise in the biomedical field, professionals typically can only process such data manually. In addition, modem models of relation extraction for tasks like biomedical information extraction are based on supervised learning of relations from small hand labeled corpora. Classifying large-scale biomedical text structuring has become a major research topic at the intersection of biomedical and artificial intelligence fields.

BRIEF DESCRIPTION OF THE DRAWINGS

FIG. 6 is a block diagram of a method for data packaging for distantly supervised data entity relation extraction in accordance with one or more embodiments of the present technology.

Figure 1:
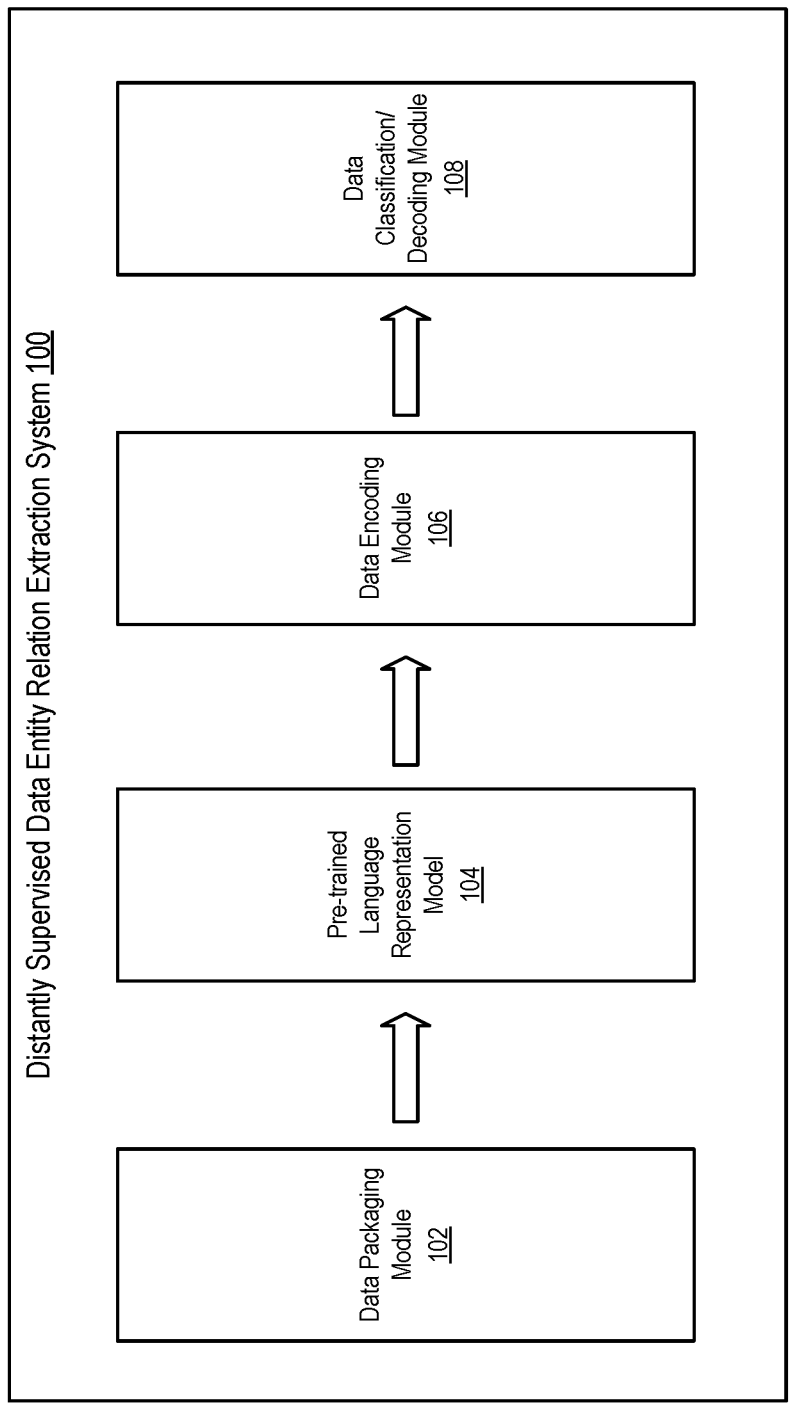
FIG. 1 is a block diagram illustrating an example distantly supervised data entity relation extraction system configured in accordance with one or more embodiments of the present technology.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different embodiments designate like or corresponding, but not necessarily identical, elements.

DETAILED DESCRIPTION

Information extraction can process biomedical data from an unstructured form into a structured one. Relation extraction is a subfield of information extraction and has been recognized as an essential technique for natural language processing (NLP). Its purpose is to extract triples (e.g., head entity, relation, tail entity) in sentences. The relationships extracted from the biomedical literature can be used to construct a biomedical knowledge graph, providing structured information for the biomedical research community. The published relation extraction methods based on supervised learning generally have high accuracy and reliable model, but it also require a lot of workforce, cost, and time to label the dataset. Further, relation extraction methods based on deep learning heavily rely on large-scale training data, which may require expensive processing time and costs.

In supervised approaches and to extract relational facts from biomedical literature or text, sentences in a small corpus are firstly labeled for presence of entities and the relations therebetween. In some Automatic Content Extraction (ACR) models, the corpus may include thousands of documents in which a single digit or double digits major relations can be labeled, totaling up to thousands of relation instances. In these approaches, supervised classifiers can be used to label the relation mention holding between the pair of entities. A challenge for these approaches is that the labeled training data is expensive to product and poor in quality. Moreover, the resulted classifiers may be biased toward a text domain because the relations have been pre-labeled in a limited number of corpuses.

To achieve the automation of relation extraction and address the above-described concerns, the present disclosure is directed to distant supervision for data entities relation extraction. It is assumed that there are some relationships between two entities in a knowledge base, and other sentences that contain these two entities have the same relationships. In particular, relation extraction with distant supervision in accordance with the present technology includes utilizing the distant supervision hypothesis to construe the dataset, using a feature-based method and methods based on deep learning, to extract text features of the distant supervision construction dataset, and build a suitable model to train the relation classifier. However, the above noted distant supervision only works occasionally. Further, researchers developed a method called Multi-instance Learning (MIL) for relation extraction tasks, which packs different sentences containing the same entity pair into a bag, and learns in units of the bag. A classifier can be established by learning multiple example bags to predict the labels of unknown bags. The MIL method can significantly reduce the noise of DS, but it cannot exploit the sentence feature information in the bag. Due to its specialization, the acquisition of sentence features in the biomedical field requires additional professional annotations.

In the following description, for the purposes of explanation, numerous specific details are set forth to provide a thorough understanding of the embodiments of the disclosure. A person of ordinary skill in the art will readily appreciate, however, that embodiments of the disclosure may be practiced without these specific details or with an equivalent arrangement. In other cases, well-known structures and devices are shown in block diagram form in order to avoid unnecessarily obscuring the embodiments of the disclosure.

FIG. 1 is a block diagram illustrating an example of a distantly supervised data entity relation extraction system 100 configured in accordance with embodiments of the present technology. As shown, the data entity relation extraction system 100 includes a data packaging module 102, a pre-trained language representation model 104, a data encoding module 106, and a data classification/decoding module 108. During the data entity relation extraction processing of biomedical information, raw text data and data entity relationships can be input to and extracted from the data packaging module 102 and the data classification/decoding module 108 of the entity relation extraction system 100, respectively.

The distantly supervised data entity relation extraction system 100 can automatically identify entity relations in biomedical text using external knowledge bases. For example, the operations of the distantly supervised data entity relation extraction system 100 may include training a relation extraction model, e.g., the data classification/decoding module 108 on labeled data to learn to identify the relation types between entities in text. A trained distantly supervised data entity relation extraction system 100 can also be applied to new text to infer the relation types between two or more different entities in the new text.

In supervised approaches, specifically for distant supervision, raw text data needs to be transformed into a format that can be used to train a deep learning or a natural language model. For example, the data packaging module 102 can be configured to gather and compile a large amount of relevant biomedical information as input to the data entity relation extraction system 100. Raw data including, for example, text corpora, audio recording, and/or image data can be collected as input to the data packaging module 102. In some embodiments, the raw data may be pre-processed to make it useable by the data packaging module 102. For example, the raw data may be filtered and normalized to remove noise, inconsistencies, and/or irrelevant information. Such pre-processing may also include converting the raw data into a textual format that can be used as input to the data packaging module 102. In some embodiments, the data packaging module 102 may include a data selecting procedure to select or divide biomedical data into smaller and manageable data bags to be used during the training process. Text sentences having similar entity pairs (e.g., head entity and tail entity) may be batched into a data bag to allow the deep learning or natural language model to be trained more efficiently and accurately.

In addition, the data packaging module 102 may also include procedures to apply entity markers to text data batched in a common (i.e., same) data bag. For example, entity markers can be applied to a group of sentences included in a data bag, generating a token sequence for each of the group of sentences. Each of the generated token sequences may include position markers for the beginning and end of corresponding sentences. Further, the generated token sequence may also include position markers for a start position and an end position of each of the entity pairs (e.g., a head entity and a tail entity). In distant supervision, token sequence refers to a sequence of tokens (e.g., words) provided in a text, sentence, or document. In the present disclosure, token sequence can serve as input to the pre-trained language representation model 104 and one goal of the present technology is to predict correct labels in the generated token sequence.

As shown in FIG. 1, the pre-trained language representation model 104 of the data entity relation extraction system 100 receives input token sequences from the data packaging module 102 and outputs sentence feature vectors to the data encoding module 106. In some embodiments, the pre-trained language representation model 104 can include a stack of transformer layers, each of which composed of a self-attention mechanism and feedforward neural network. The transformer layers of the pre-training language representation model can be trained using a masked language modeling objective, in which a certain portion of token sequence are randomly masked and the model is trained to predict the masked tokens based on surrounding context in the sentence. Here, the pre-trained language representation model 104 can be trained to extract the connection of paired entities of the sentence into a sentence feature vector. For example, a sentence position token vector and two entity start position token vectors can be extracted from input token sequence and converted into a corresponding sentence feature vector for forward neural network proceeding in the data entity relation extraction system 100.

In some other embodiments, commercially available or open-source neural network deep learning models can be implemented into the data entity relation extraction system 100 and perform as the pre-trained language representation model 104. For example, a pre-trained language model specifically designed for biomedical text processing named BioBERT (Bidirectional Encoder Representations from Transformers) can be utilized in the present disclosure. BioBERT is a domain-specific language representation model pre-trained on a large-scale biomedical corpus. Besides the stack of transformer layers, BioBERT also includes a task specific output layer that can be fine turned for entity recognition or relation extraction tasks. The BioBERT model can be configured to convert each word in token sequence into a one-dimensional vector through a query word vector table. Specifically, BioBERT can be configured to get two other parts of an input token sequence including a segment vector and a position vector besides the word vector. For the segment vector, the value of this vector can be automatically learned during the model training process, therefore it can be used to describe the global semantic information of the text and integrated with the semantic information of a single word. In addition, for the position vector, BioBERT can append a different vector to the words in different positions to distinguish them, because the semantic information carried by the words appearing in different positions of the text is generally different (e.g., "I like you" and "you like me" are different).

The data encoding module 106 of the data entity relation extraction system 100 is configured to aggregate a group of sentence features outputted from the pre-trained language representation model 104 into a bag encoding vector. In particular, the data encoding module 106 may aggregate the sentence location and the start location of the paired entities, respectively, into the bag encoding vector. Here, the data encoding module 106 may utilize various mechanisms to perform the aggregation. For example, an at least one (ONE) mechanism can be used to only aggregate sentence vector having a largest corresponding category score. In another example, an average (AVE) mechanism can be used to aggregate an average of all sentence vector contained in a data bag. In another example, a selective attention (ATT) mechanism can be used to increase weight of positive sample sentences and reduce weight of negative sample sentences.

Once the bag encoding vector is formed, it is further input into the data classification/decoding module 108 for data entity relation extraction. In this module, the data entity relations contained in the group of sentences that are included in the data bag can be classified and the result of biomedical entity relation classification can be obtained. In some embodiments, the data classification/decoding module 108 can include a linear layer and a SoftMax layer for the entity relation classification. The linear layer may perform as an intermediate layer and the SoftMax layer can be utilized as a final relation classifier. In relation extraction neural networks, the linear layer usually refers to a type of fully connected layer that applies a linear transformation to the input data. The linear layer may include a set of learnable weights and biases applicable to the input in order to produce an output. An output of the linear layer can be passed through an activation function to introduce nonlinearity into the neural network. In biomedical context relation extraction, the input to the linear layer of the data classification/decoding module 108 can be the bag encoding vector generated from the input biomedical sentence or text, and the output can be a vector that represents the presence or absence of a particular relation between two entities in the sentence. By applying a linear transformation to the input bag encoding vector, the linear layer can be configured to extract relevant features from the input biomedical text for identifying the relation between the entities. In the data classification/decoding module 108, the SoftMax layer can be a type of activation function neural network layer configured to produce a probability distributions. The SoftMax layer can take input from the linear layer described above and produce a probability distribution over the possible entity relationships. Specifically, the SoftMax layer may apply exponential function to each element of the bag encoding vector processed by the linear layer and then normalize the resulted possible entity relationships so that their summary is one. This normalization process ensures that the output of the SoftMax layer can be interpreted as an entity relation probability.

In this example, all features of the obtained bag encoding vectors are connected through the linear layer. Thereafter, the connected results can be input into the SoftMax relation classifier to obtain conditional probabilities of feature vector corresponding to different relation types. The relation corresponding to the highest probability can be the relation result. In this example, the SoftMax layer can be configured to present multi-classification results in a probabilistic form, which is often used in solving multi-classification tasks.

In some embodiments, the distantly supervised data entity relation extraction system 100 may update its configurations (e.g., weights, biases, or other parameters) based on the assessment of its prediction (e.g., probabilities of entity relations) and reference feedback information (e.g., user indication of accuracy, reference labels, or other information). In other embodiments, where the distantly supervised data entity relation extraction system 100 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, the distantly supervised data entity relation extraction system 100 may be trained to generate better predictions.

Figure 2:
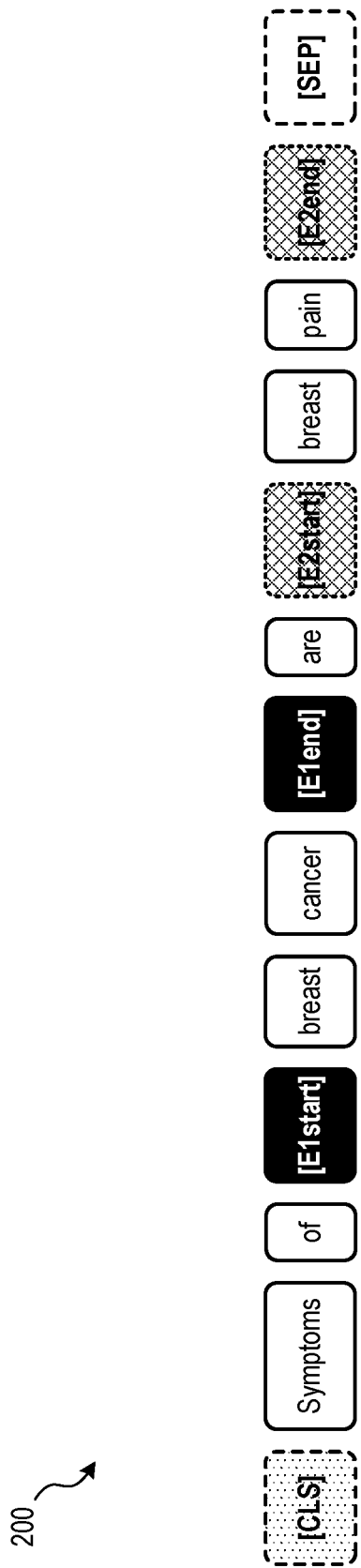
FIG. 2 illustrates an example token sequence configured in accordance with one or more embodiments of the present technology.

FIG. 2 illustrates an example token sequence 200 generated by the data packaging module 102 of the distantly supervised data entity relation extraction system 100 (FIG. 1) in accordance with an embodiment of the present technology. As described, biomedical data including text sentences that have similar entity pairs can be batched into data bags to assist the entity relation extraction processing. In this example, a sentence of "Symptoms of breast cancer are breast pain" has been divided and stored into a data bag, in which the contained sentences all have the entities of "breast cancer" and "breast pain". In some embodiments, the data packaging module 102 may apply entity markers to the context of this sentence to generate a corresponding token sequence, e.g., the token sequence 200 as shown in FIG. 2. In this example, the sentence positions including a beginning position and an ending position have been marked as [CLS] and [SEP], and highlighted at the front and rear position of the sentence, respectively. Further, the beginning and ending positions of each of the paired entities are marked within the sentence. Here, the beginning position marker [E1start] and ending position marker [E1end] of the head entity "breast cancer", as well as the beginning position marker [E2start] and ending position marker [E2end] of the tail entity "breast pain" can be implemented into the corresponding positions of the sentence. In addition, the sentence positions marked in [CLS] and [SEP] may refer to specific positions of the sentence within a larger database, e.g., the data bag. In some embodiments, the data packaging module 102 may apply entity markers to a subset of the sentences included in the data bag to generate a token sequence.

In some embodiments, the sentence positions [CLS] and [SEP] can be absolute positions of the sentence in the data bag, rather than relative positions within a smaller subsection, e.g., the sentence. In contrast, the beginning and ending positions of each of the pair entities can be relative positions of the entity within the sentence. For example, [E1start] may refer to a starting position of the head entity relative to the starting position of the sentence. Likewise, [E1end] may refer to an ending position of the head entity relative to the starting position of the sentence. In some other embodiments, the starting and ending markers of the pair entities may refer to a local subset of tokens. In some other examples, the data packaging module 102 may apply entity markers to the context of the sentence to generate token sequence for one entity included in the sentence. For example, besides the beginning position and an ending position of the sentence, the beginning and ending positions of one entity included in the sentence, e.g., one of the paired entities can be marked within the sentence.

Figure 3:
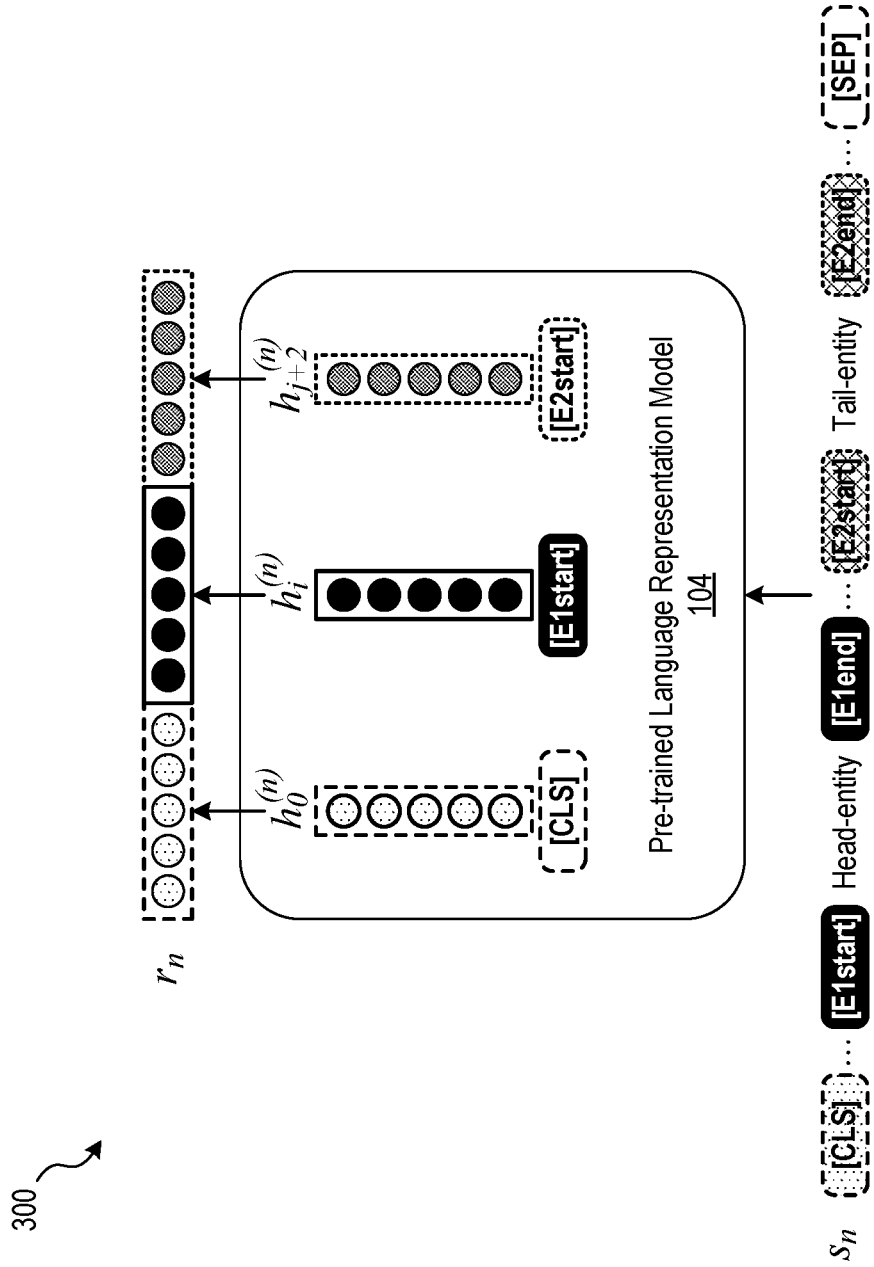
FIG. 3 illustrates an example proceeding of generating token sequences in accordance with one or more embodiments of the present technology.

FIG. 3 illustrates an example proceeding 300 of generating token sequences in the pre-trained language representation model 104 (FIG. 1) and outputting such sequences to the data encoding module 106 (FIG. 1). As shown in the proceeding 300, a token sequence $S_n$ can be input to the pre-trained language representation model 104 to generate a sentence feature vector $r_n$. Here, the token sequence $S_n$ can be constructed through the embedded sentence encoding layers including transformer layers and activation layer, and vectorized into the sentence feature vector $r_n$.

In some embodiments, the sentence feature vector $r_n$ of corresponding token sequence $S_n$ can be generated by fusing the sentence position information [CLS], the start position information [E1start] of the head entity, and the start position information [E2start] of the tail entity into the sentence feature vector $r_n$. In this example, BioBERT can be used as the pre-trained language representation model 104 to achieve a required processing on biomedical entity relation extract tasks. As described earlier, MIL can significantly reduce the noise of distant supervision, but cannot exploit the sentence feature information in the data bag. In biomedical texts, it is necessary to consider the position of the entity in the sentence and the semantic information of the whole sentence, so as to efficiently extract the relation between entity pairs. Therefore, this embodiment may connect the sentence position token (e.g., [CLS]) and the start position markers of the head and tail entity (e.g., [E1start], and

[E2start]) during the sentence vector encoding, making a full use of the output containing useful sentence feature information in BioBERT.

As shown in FIG. 3, by extracting a last hidden layer of BioBERT $H=[h_0, \ldots, h_q]$, the fixed-length sentence encoding representation r can be obtained as:

$$[h_0, \ldots, h_q] = \text{BioBERT}(x)$$

wherein, $q=|x|$, $x=[x_0 \ldots [\text{E1start}]x_i \ldots x_{j-1}[\text{E1end}] \ldots [\text{E2start}] x_k \ldots X_{l-1} [\text{E2end}] \ldots x]$, $x_0=[\text{CLS}]$, $[x_i \ldots x_{j-1}]$ represents the head entity, $[x_k \ldots x_{l-1}]$ represents the tail entity, $x_q=[\text{SEP}]$.

To obtain a richer sentence feature information and more accurate sentence encoding representation, this embodiment concatenates the [CLS] token $h_0$ with the representations of the two entities start position [E1start], [E2start] tokens $h_i$, $h_{j+2}$ as sentence encoding representation $r_n=[h_0^n; h_i^n; h_{j+2}^n] \in R$ (R denotes the set of relationships from a knowledge base).

Figure 4:
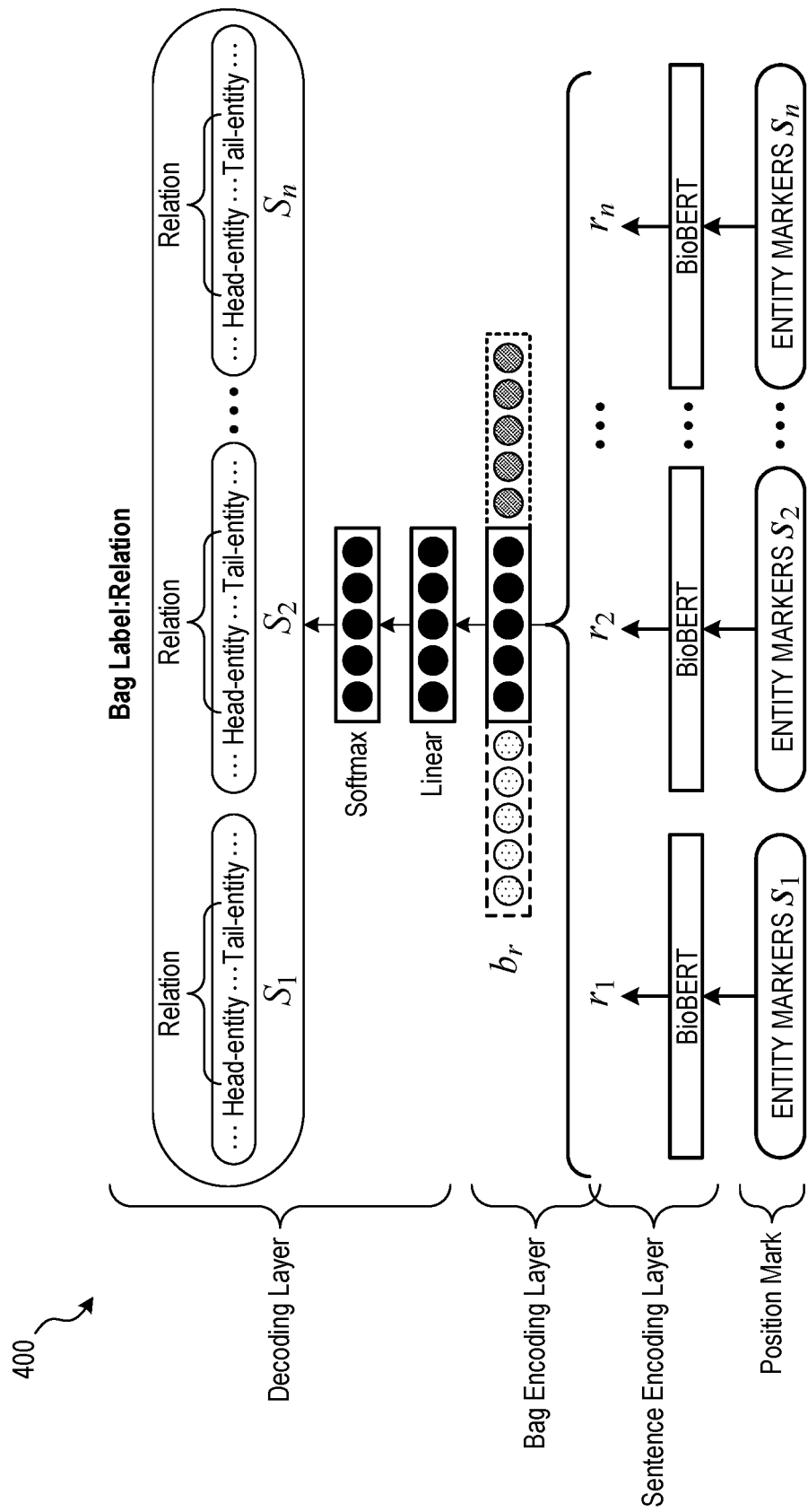
FIG. 4 illustrates a distantly supervised data entity relation extraction proceeding configured in accordance with one or more embodiments of the present technology.

FIG. 4 illustrates a distantly supervised data entity relation extraction proceeding 400 configured in accordance with some embodiments of the present disclosure. This proceeding 400 may utilize BioBERT models as the pre-trained language representation model 104 (FIG. 1) to generate a sentence feature vector $r_n$. In addition, a MIL framework may be included in this distant supervision to alleviate the issues of mislabeling. Specifically, the MIL framework can model the task of data entity relation extraction as a bag-level classification problem, wherein each date bag corresponds to a set of instances that correspond to a particular entity pair, and the goal is to predict the relation label for each data bag. During the training, the MIL framework can use a set of heuristically generated rules to automatically label the data bag based on the presence or absence of the relationship in the corresponding text segments.

In this example, the biomedical text can be divided into m bags, each containing n sentences having the same entity pair, e.g., a head entity of "breast cancer" and a tail entity of "breast pain", as described earlier. These n sentence instances can be named as $S_1, S_2, \ldots,$ and $S_1$ in a data bag. A position marker can be applied to each sentence included in the data bag to get a sequence of sentence tokens. Specifically, [CLS] can be marked at the beginning of each input sentence, [SEP] can be marked at the end of the sentence, and [E1start], [E1end], [E2start], and [E2end] can be respectively marked in the sentence as the start and end positions of the paired head entity and tail entity.

After the processing through the sentence encoding layers of the pre-trained language representation model 104 (e.g., BioBERT), corresponding sentence vector representations $r_1, r_2, \ldots, r_n$ can be obtained. As shown in FIG. 4, the sentence vector representations can be further input into the bag encoding layer of the data encoding module 106 to form the bag encoding vector $b_r$. In some embodiments, the bag encoding vector $b_r$ can be aggregated from the sentence feature vectors $r_1, r_2, \ldots, r_n$. In the present technology, various mechanisms or methods can be adopted in the data encoding module 106 for the aggregation, including:

(1) At Least One (ONE) mechanism. This method selects the sentence vector with the largest corresponding category score in the bag, representing the current $b_r$.

(2) Average (AVE) mechanism. This method takes the average of all sentence vectors in a bag as the current $b_r$:

$$b_r = \frac{1}{n}\sum_{i=1}^{n} r_i$$

(3) Selective Attention Mechanism (ATT) mechanism. This method applies the attention mechanism to increase the weight of positive sample sentences stored in the data bag and reduce the weight of noise sample sentences:

$$\alpha_i = \frac{\text{Exp}(R_r r_i)}{\sum_{k=1}^{n} \text{Exp}(R_r r_k)}$$

$$b_r = \sum_{i=1}^{n} \alpha_i r_i$$

wherein, Rr is the vector representation of the bag label relationship, which is obtained by the weight matrix in the fully connected layer, similar to the subscript indexing of the embedding layer. $a_r$ is the Attention weight.

In this example, the bag encoding vector $b_r$ obtained by bag aggregation in the bag encoding layer can firstly connects all the features through a linear layer of the data encoding module 106. Further, the connected result of $b_r$ can be input into the SoftMax relation classifier layer connected to the linear layer to obtain the conditional probability of the feature vector corresponding to different relationships. The expression can be described as follows:

$$P(r) = \text{Softmax}(W_r * b_r + B_r)$$

wherein, $W_r$ is the relationship weight matrix, $B_r$ is the bias vector. The relation corresponding to the highest probability can be labeled as the relation label of the data bag, and the entity pairs of all sentences in the bag can be labeled with this relation.

Figure 5:
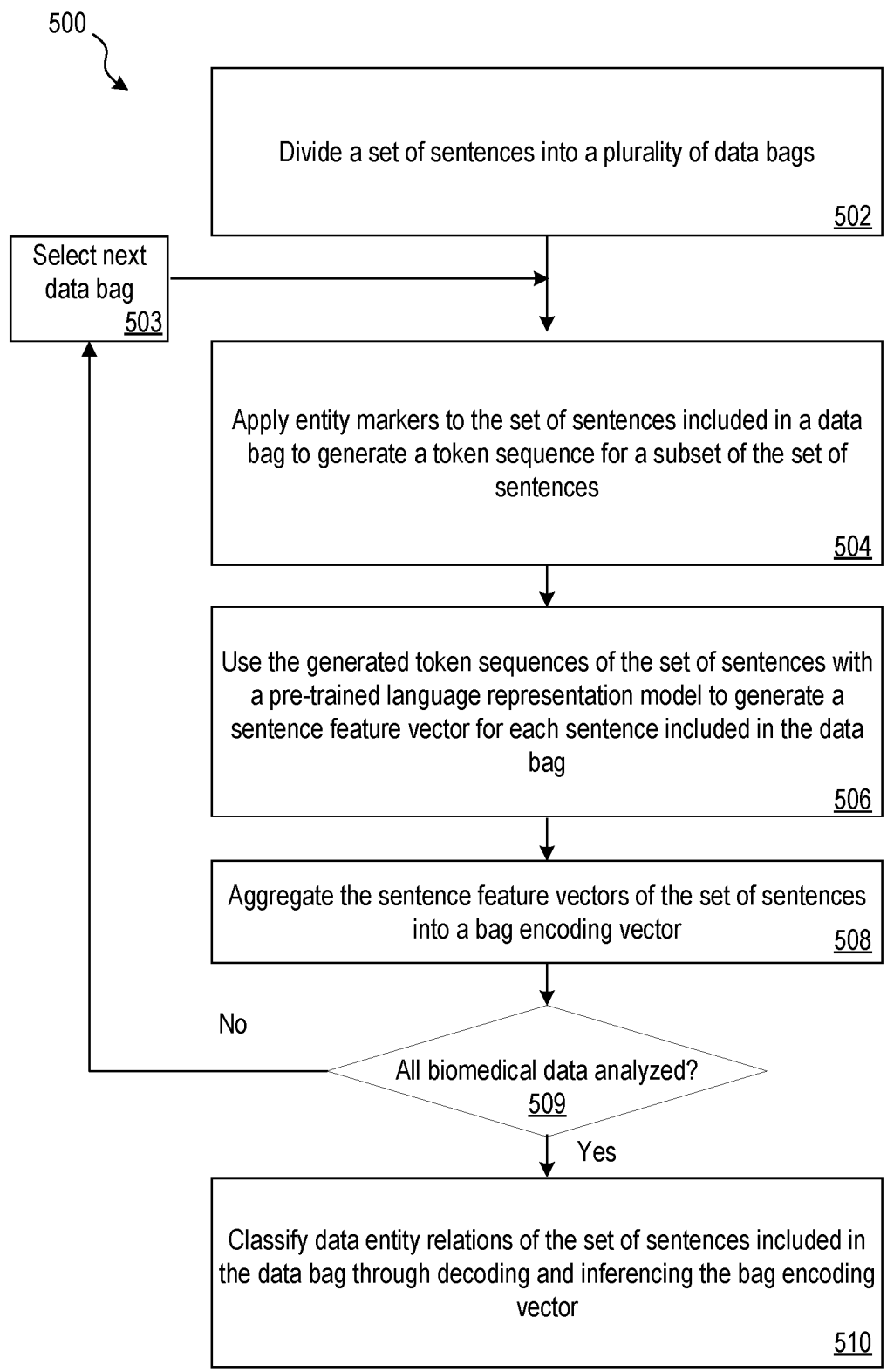
FIG. 5 is a block diagram of a method for distantly supervised data entity relation extraction in accordance with one or more embodiments of the present technology.

FIG. 5 is a block diagram illustrating a method 500 for distantly supervised data entity relation extraction in accordance with one or more embodiments of the present disclosure. Beginning at block 502, the method 500 includes dividing a set of sentences into a plurality of data bags. The divided sentences have the same entity pair in corresponding data bags, with the entity pair including a head entity and a tail entity. For example, biomedical data, such as text sentences in a database, can be divided (e.g., in the data packaging module 102-FIG. 1), into m data bags, with each data bag containing n sentences having the same entity pair, e.g., a head entity of "breast cancer" and a tail entity of "breast pain".

The method 500 continues at block 504 with applying entity markers to a set of sentences included in the data bag to generate a token sequence for a subset of the set of sentences. The generated token sequence includes position markers for the beginning and ending of each sentence, as well as start and end position marks of two paired entities included in each of the plurality of sentences. For example, a position marker can be applied to each sentence included in the data bag to get a sequence of sentence tokens. Specifically, [CLS] can be marked at the beginning of each input sentence, [SEP] can be marked at the end of the sentence. Moreover, entity markers [E1start], [E1end], [E2start], and [E2end] can be respectively implemented in the sentence as the start and end positions of the above-described head entity and tail entity.

At block 506, the method 500 further includes using the token sequences of the set of sentences with a pre-trained language representation model to generate a sentence feature vector for each sentence included in the data bag. Each sentence feature vector includes a sentence position token vector and two entity start position token vectors. For example, the pre-trained language representation model 104 (FIG. 1) can be used to convert each word of the input token sequence into a one-dimensional sentence feature vector through neural network layers embedded in the pre-trained language representation model 104. In particular, the sentence feature vector may include the sentence position [CLS], and starting positions [E1start] and [E2start] of the head entity and tail entity.

The method 500 continues at block 508 with aggregating, in a data encoding module, the sentence feature vectors of the set of sentences into a bag encoding vector. For example, a plurality of sentence feature vectors $r_1, r_2, \ldots, r_n$ that are generated from corresponding sentences included in a data bag can be proceeded into a bag encoding vector $b_r$. The bag encoding vector $b_r$ can be aggregated from the plurality of sentence feature vectors $r_1, r_2, \ldots, r_n$ using various mechanisms such as ONE, AVE, or ATT mechanisms.

At block 509, the method includes determining whether all the biomedical data has been analyzed by the process between blocks 504 to 508. If not, the method 500 returns to block 503 where sentences included in new data bags are selected for analysis by the method 500 between steps 504 and 508. If all of the biomedical data has been analyzed, the method 500 continues to block 510.

Lastly, at block 510, the method 500 includes classifying data entity relations of the set of sentences contained in the data bag through decoding and inferencing the bag encoding vector. For example, the SoftMax layer of the data classification/decoding module 108 (FIG. 1) can be used to process the input bag encoding vector $b_r$ to obtain the conditional probability of the feature vector corresponding to different relationships. The relation corresponding to the highest probability can be labeled as the relation label of the data bag, and the entity pairs of all sentences in the bag, e.g., the head entity and tail entity, can be labeled with this relation.

Although the steps of the method 500 are discussed and illustrated in a particular order, the method 500 illustrated in FIG. 5 is not so limited. In other embodiments, the method 500 can be performed in a different order. In these and other embodiments, any of the steps of the method 500 can be performed before, during, and/or after one of the other steps of the method 500. Moreover, a person of ordinary skill in the relevant art will recognize that the illustrated method can be altered and still remain within these and other embodiments of the present technology.

FIG. 6 is a block diagram illustrating a method 600 of applying entity markers on the divided biomedical sentences in the data bag in accordance with one or more embodiments of the present technology. The method 600 begins at block 602 with marking the beginning and ending locations of each of the subset of the set of sentences. For example, a beginning position and an ending position of a biomedical text sentence can be marked as [CLS] and [SEP], respectively. In addition, the beginning and ending marks [CLS] and [SEP] can be implemented in to corresponding positions of the sentence, as shown and described above with references to FIG. 2 of the present disclosure. In some embodiments, the sentence positions [CLS] and [SEP] can be absolute positions of the sentence in the data bag. In other embodiments, however, this arrangement can vary.

At block 604, the method 600 includes identifying a first front position and a first rear position of the head entity and a second front position and a second rear position of the tail entity. For example, referring again to FIG. 2, the positions of the head entity "breast cancer" and tile entity "breast pain" can be identified in the sentence. The data packaging module 102 (FIG. 1) can be used to identify the starting position [E1start] and ending position [E1end] of the head entity "breast cancer", respectively. Similarly, the data packaging module 102 can also identify the starting position [E2start] and ending position [E2end] of the tile entity "breast pain", respectively. In particular, the beginning and ending positions of each of the pair entities can be relative positions of the entity within the sentence. For example, [E1start] may refer to a starting position of the head entity relative to the starting position of the sentence. Likewise, [E1end] may refer to an ending position of the head entity relative to the starting position of the sentence.

The method 600 continues at block 606 with marking the identified first front position and first rear position at the beginning and ending locations of the head entity respectively. For example, the beginning position marker [E1start] and ending position marker [E1end] of the head entity "breast cancer" can be implemented into the corresponding positions of the sentence shown in FIG. 2.

Lastly, at block 608, the method 600 includes marking the identified second front position and second rear position at the beginning and ending locations of the tail entity respectively. For example, the beginning position marker [E2start] and ending position marker [E2end] of the tail entity "breast pain" can be implemented into the corresponding positions of the sentence shown in FIG. 2.

Figure 7:
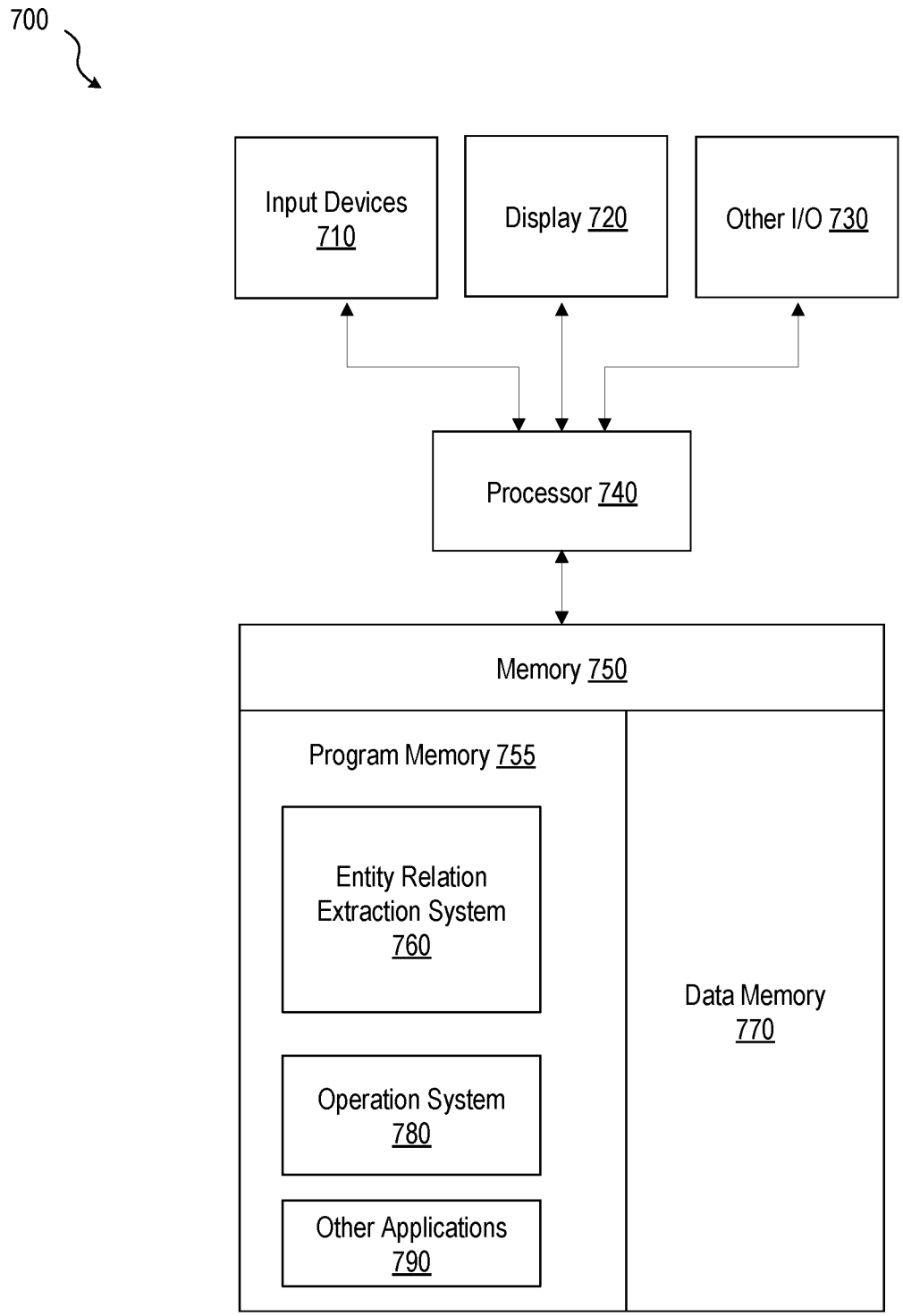
FIG. 7 is a block diagram illustrating an overview of devices on which some implementations of the disclosed technology can operate.

Any one of the modules and models described above with reference to FIGS. 1-6 can be incorporated into any of a myriad of complex systems or devices. FIG. 7, for example, is a block diagram illustrating an overview of devices on which some implementations of the disclosed technology can operate. The devices can comprise hardware components of a device 700 that can implement at least part of the distantly supervised data entity relation extraction system 100. Device 100 can include one or more input devices 710 that provide input to the processor 740 (e.g., CPU(s), GPU(s), HPU(s), etc.), notifying it of actions. The actions can be mediated by a hardware controller that interprets the signals received from the input device and communicates the information to the processor 740 using a communication protocol. Input devices 710 include, for example, a mouse, a keyboard, a touchscreen, an infrared sensor, a touchpad, a wearable input device, a camera- or image-based input device, a microphone, or other user input devices.

Processor 740 can be a single processing unit or multiple processing units in a device or distributed across multiple devices. Processor 740 can be coupled to other hardware devices, for example, with the use of a bus, such as a PCI bus or SCSI bus. The processor 740 can communicate with a hardware controller for devices, such as for a display 720. Display 720 can be used to display text and graphics. In some implementations, display 720 provides graphical and textual visual feedback to a user. In some implementations, display 720 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 730 can also be coupled to the processor, such as a network card, video card, audio card, USB, fire-wire or other external device, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The processor 740 can have access to a memory 750 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 755 that stores programs and software, such as an operating system 780, distantly supervised data entity relation extraction system/platform 760, and other application programs 790. Memory 150 can also include data memory 770 that can include biomedical textual data, patient profile data, medical provider data, rules for transforming biomedical data and patient profile data into data bag, GUI components, templates for user notifications, configuration data, settings, user options or preferences, etc., which can be provided to the program memory 755 or any element of the device 700.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
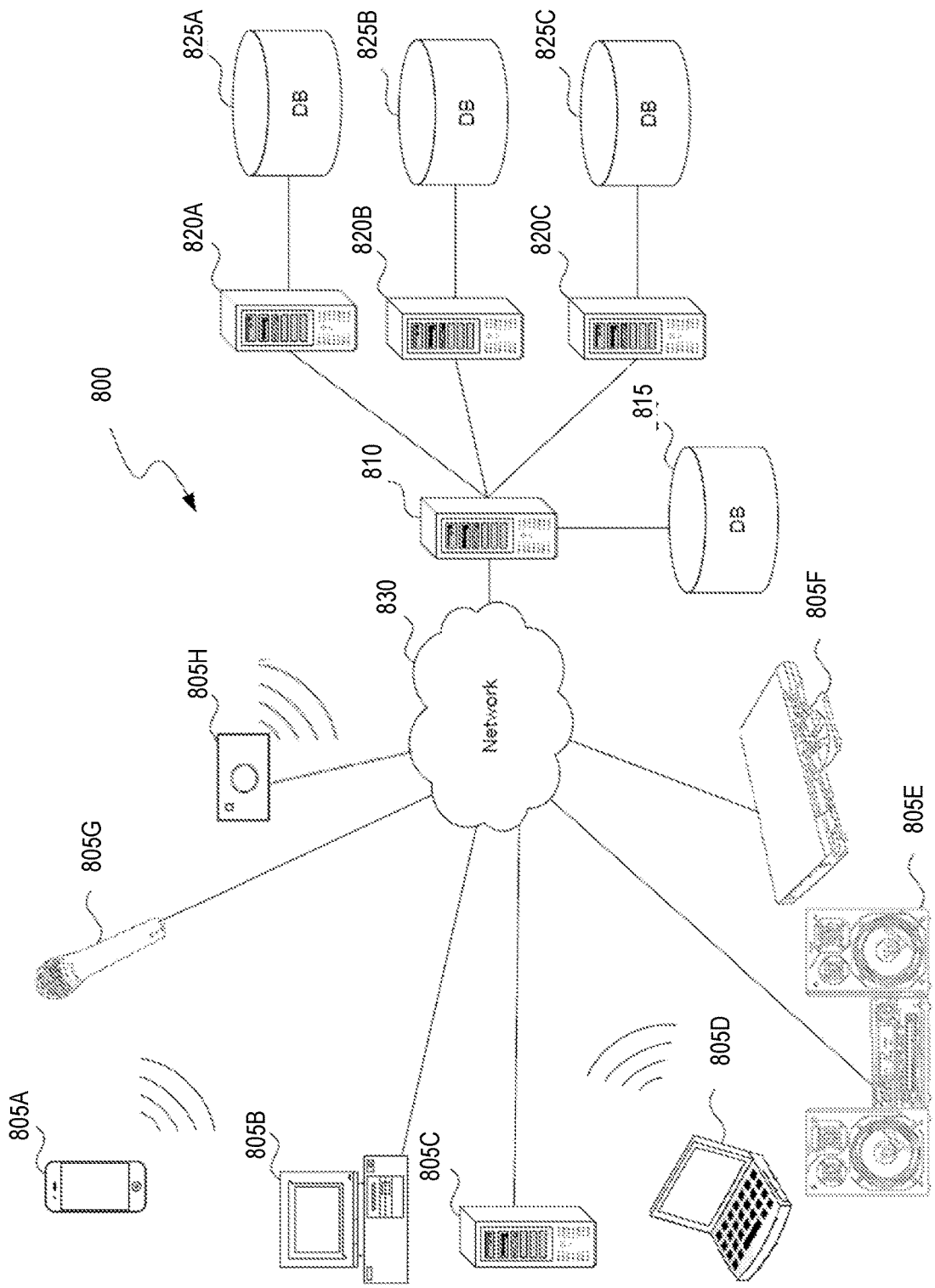
FIG. 8 is a block diagram illustrating an overview of an environment in which some implementations of the disclosed technology can operate.

FIG. 8 is a block diagram illustrating an overview of an environment 800 in which some implementations of the disclosed technology can operate. Environment 800 can include one or more client computing devices 805A-H, examples of which can include the system 100 described in FIG. 1. In the illustrated embodiment, device 805A is a wireless smart phone or tablet, device 805B is a desktop computer, device 805C is a computer system, device 805D is a wireless laptop, device 805E is a smart watch, and device 805F is a networked camera system. These are only examples of some of the devices, and other embodiments can include other computing devices. For example, device 805E can be other wearable or tracking devices including, but not limited to, Apple Watch™, Fitbit™, Sleep 8™, WHOOP™, Oura Smart Ring™, and Garmin™. Client computing devices 805 can operate in a networked environment using logical connections 810 through network 830 to one or more remote computers, such as a server computing device.

In some implementations, server 810 can be an edge server which receives client requests and coordinates fulfillment of those requests through other servers, such as servers 820AC. Server computing devices 810 and 820 can comprise computing systems, such as device 100. Though each server computing device 810 and 820 is displayed logically as a single server, server computing devices can each be a distributed computing environment encompassing multiple computing devices located at the same or at geographically disparate physical locations. In some implementations, each server 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

It should be noted here that the above-described data packaging module, pre-trained language representation model, data encoding module, and data classification and decoding module correspond to the specific steps described above, and the above modules are the same as the examples and application scenarios realized by the corresponding steps, but are not limited to the contents disclosed. It should be noted that the above modules, as part of the system, can be executed in a computer system such as a set of computer executable instructions. For example, as noted above, a computer readable storage medium can be used to store computer instructions. When the computer instructions are executed by a processor, the distantly supervised biomedical entity relation extraction method described in the above embodiment can be performed and completed.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It should be emphasized that many variations and modifications can be made to the above-described examples, the elements of which are to be understood as being among other acceptable examples. All such modifications and variations are intended to be included herein within the scope of this disclosure and protected by the following claims. Various other aspects, features, and advantages of the disclosure will be apparent through the detailed description of the disclosure and the drawings attached hereto. It is also to be understood that both the foregoing general description and the following detailed description are examples and are not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

What is claimed is:

1. A method for entity relations extraction, the method comprising:
applying entity markers to a set of sentences included in a data bag to generate a token sequence for a subset of the set of sentences, the token sequence including a beginning position mark and an ending position mark of a corresponding sentence, as well as a front position mark and a rear position mark of at least one entity included in each of the subset of the set of sentences;
using the generated token sequences of the set of sentences with a pre-trained language representation model to generate a sentence feature vector for each sentence included in the data bag, each of the sentence feature vectors including at least one sentence position token vector and at least one entity front position token vector;
aggregating the sentence feature vectors of the set of sentences into a bag encoding vector; and
classifying data entity relations of the set of sentences included in the data bag through decoding and inferencing the bag encoding vector.

2. The method of claim 1, further comprising dividing the set of sentences into a plurality of data bags, the divided sentences having a same entity pair in corresponding data bag, wherein the entity pair includes a head entity and a tail entity of corresponding sentence.

3. The method of claim 2 wherein applying entity markers includes:
marking the beginning and ending locations of each of the subset of the set of sentences,
identifying a first front position and a first rear position of the head entity and a second front position and a second rear position of the tail entity,
marking the identified first front position and first rear position at the beginning and ending locations of the head entity respectively, and
marking the identified second front position and second rear position at the beginning and ending locations of the tail entity respectively.

4. The method of claim 3 wherein generating the token sequence for the subset of the set of sentences includes sampling position information of the sentence, the first front position of the head entity, and the second front position of the tail entity into a token sequence of corresponding sentence.

5. The method of claim 3 wherein the sentence feature vector of the subset of the set of sentences is generated by fusing the position information, front position information of the head entity, and front position information of the tail entity into the sentence feature vector.

6. The method of claim 3 wherein the bag encoding vector is generated by:
aggregating the location marker of each of the sentence feature vectors into a location component of the bag encoding vector,
aggregating the front location marker of head entity of each of the sentence feature vectors into a head entity front location component of the bag encoding vector, and
aggregating the front location marker of tail entity of each of the sentence feature vectors into a tail entity front location component of the bag encoding vector.

7. The method of claim 3, wherein the bag encoding vector is generated by aggregating the sentence feature vectors of the set of sentences through mechanisms including:
at least one (ONE) mechanism in which the sentence vector having a largest corresponding category score is aggregated,
average (AVE) mechanism in which an average of all sentence vectors in a data bag is aggregated, and/or
Selective Attention Mechanism (ATT) in which attention mechanism is applied to increase weight of positive sample sentences and reduce weight of negative sample sentences.

8. The method of claim 1, wherein the sentence feature vectors of the set of sentences are generated by processing the token sequences through an embedded layer and a transformer layer of the pre-trained language representation model.

9. The method of claim 8, wherein the pre-trained language representation model can be configured to:
convert words of the subset of the set of sentences into one dimensional word vectors through a query word vector table,
collect segment vector information and position vector information for the subset of the set of sentences, and
summarize the word vector, the segment vector, and the position vector of the subset of the set of sentences.

10. The method of claim 1, wherein generating of sentence feature vector can be conducted by a pre-trained domain-specific language representation model including BioBERT.

11. The method of claim 1, wherein the classification of data entity relations of the set of sentences includes processing the bag encoding vector through a liner layer and a SoftMax layer.

12. The method of claim 1, wherein all features of the set of sentences are connected with the bag encoding vector through a liner layer, wherein the connected features of the set of sentences are classified in a SoftMax layer to generate conditional probabilities of the features corresponding to various relation types, and wherein the relation corresponding to a highest probability is classified as a relation classification result.

13. A system comprising one or more computers and one or more storage devices storing instructions that are operable, when executed by the one or more computers, to cause the one or more computers to perform operations comprising:
applying entity markers to a set of sentences included in a data bag to generate a token sequence for a subset of the set of sentences, the token sequence including a beginning position mark and an ending position mark of a corresponding sentence, as well as a front position mark and a rear position mark of at least one entity included in the subset of the set of sentences;
using the generated token sequences of the set of sentences with a pre-trained language representation model to generate a sentence feature vector for each sentence included in the data bag, each of the sentence feature vectors including at least one sentence position token vector and at least one entity front position token vector;
aggregating, the sentence feature vectors of the set of sentences into a bag encoding vector; and
classifying data entity relations of the set of sentences included in the data bag through decoding and inferencing the bag encoding vector.

14. The system of claim 13, wherein the operations further comprising dividing the set of sentences into a plurality of data bags, the divided sentences having a same entity pair in corresponding data bag, wherein the entity pair includes a head entity and a tail entity of corresponding sentence.

15. The system of claim 14, wherein applying entity markers includes:
- marking the beginning and ending locations of each of the subset of the set of sentences,
- identifying a first front position and a first rear position of the head entity and a second front position and a second rear position of the tail entity,
- marking the identified first front position and first rear position at the beginning and ending locations of the head entity respectively, and
- marking the identified second front position and second rear position at the beginning and ending locations of the tail entity respectively.

* * * * *